(12) United States Patent
Chang et al.

(10) Patent No.: US 8,390,964 B2
(45) Date of Patent: Mar. 5, 2013

(54) PROTECTION APPARATUS AND METHOD FOR AN ISOLATED TYPE POWER SUPPLY

(75) Inventors: Kuang-Fu Chang, Kaohsiung (TW); Yu-Ming Chen, Hsinchu (TW); Pei-Lun Huang, Zhubei (TW)

(73) Assignee: Richpower Microelectronics Corporation, Grand Cayman, British West Indies (KY)

( * ) Notice: Subject to any disclaimer, the term of this patent is extended or adjusted under 35 U.S.C. 154(b) by 311 days.

(21) Appl. No.: 12/816,629

(22) Filed: Jun. 16, 2010

(65) Prior Publication Data

US 2010/0320989 A1 Dec. 23, 2010

(30) Foreign Application Priority Data

Jun. 22, 2009 (TW) ............................... 98120822 A

(51) Int. Cl.
*H02H 7/00* (2006.01)
*H02H 9/00* (2006.01)

(52) U.S. Cl. ................. 361/18; 361/86; 361/87

(58) Field of Classification Search ............... 361/18, 361/93.1, 86, 87; 323/276
See application file for complete search history.

(56) References Cited

U.S. PATENT DOCUMENTS

| 6,469,484 | B2 * | 10/2002 | L'Hermite et al. | 323/284 |
| 7,362,593 | B2 * | 4/2008 | Yang et al. | 363/21.16 |
| 7,701,184 | B2 * | 4/2010 | Pan | 323/276 |
| 2008/0232018 | A1 * | 9/2008 | Yang et al. | 361/94 |

* cited by examiner

*Primary Examiner* — Rexford Barnie
*Assistant Examiner* — Christopher Clark
(74) *Attorney, Agent, or Firm* — Muncy, Geissler, Olds & Lowe, PLLC

(57) ABSTRACT

An isolated type power supply includes a transformer, and a power switch and a current sense resistor serially connected to a primary coil of the transformer, and a protection apparatus and method monitor a control signal which is used to switch the power switch in normal operation, and trigger a signal to stop the power from switching when the control signal becomes greater than a threshold. This protection apparatus and method can more quickly detect short circuit of the current sense resistor, and prevent the isolated type power supply from overcurrent impact.

9 Claims, 4 Drawing Sheets

PROTECTION APPARATUS AND METHOD FOR AN ISOLATED TYPE POWER SUPPLY

FIELD OF THE INVENTION

The present invention is related generally to an isolated type power supply and, more particularly, to a protection apparatus and method for an isolated type power supply.

BACKGROUND OF THE INVENTION

As shown in FIG. 1, in an isolated type power supply 10, a diode bridge 12 and a capacitor 14 are used to rectify and filter the alternating-current (AC) input voltage VAC to generate a direct-current (DC) input voltage Vin applied to a primary coil Lp of a transformer 18, a power switch 20 is serially connected to the primary coil Lp to switch the current Ip of the primary coil Lp by a control signal Vgate for power delivery to a secondary coil Ls of the transformer 18 to thereby generate an output voltage Vout at an output terminal, a current sense resistor Rcs is serially connected to the primary coil Lp to detect the current Ip, and a power controller 16 determines the duty of the power switch 20 according to the voltage Vcs established by the current sense resistor Rcs and the voltage Vcomp fed back from the output terminal Vout to generate the control signal Vgate to switch the power switch 20. When the current sense resistor Rcs becomes short circuit, the voltage Vcs becomes zero, and the duty of the power switch 20 will be set to its maximum, causing the current Ip rising steeply. The large current Ip will push the transformer 18 into saturation and may burn out the current sense resistor Rcs, the power switch 20 as well as the power controller 16. Therefore, there is need of detection for short circuit of the current sense resistor Rcs to turn off the power switch 20 for protecting the power supply 10.

Conventionally, the protection mechanism monitors the voltage Vcs and triggers a warning signal if the voltage Vcs is still lower than a reference voltage after a period of time in a pulse width modulation (PWM) cycle. If the warning signal has continuously appeared in several successive cycles, for example, eight successive cycles, the current sense resistor Rcs will be identified as being short circuit, and the isolated type power supply 10 will enter a protection mode. However, in the case where the input voltage Vin is high, the current Ip increases very steeply after the current sense resistor Rcs becomes short circuit, which may place the isolated type power supply 10 under overcurrent condition before the isolated type power supply 10 enters its protection mode.

Therefore, it is desired a protection apparatus and method for quick detection for short circuit of the current sense resistor of an isolated type power supply for protecting the isolated type power supply.

SUMMARY OF THE INVENTION

An object of the present invention is directed to a protection apparatus and method for an isolated type power supply.

Another object of the present invention is directed to quick detection for short circuit of a current sense resistor in an isolated type power supply.

According to the present invention, an isolated type power supply includes a transformer, and a power switch and a current sense resistor serially connected to a primary coil of the transformer, and a protection apparatus for the isolated type power supply includes a detection circuit to monitor a control signal which is used to switch the power switch in normal operation, and a suspension circuit to stop the power switch from switching if the current sense resistor is detected as short circuit. When the control signal is detected greater than a threshold, the detection circuit triggers a protection signal to signal the suspension circuit to provide an output signal to stop the power switch from switching.

According to the present invention, an isolated type power supply includes a transformer, and a power switch and a current sense resistor serially connected to a primary coil of the transformer, and a protection method for the isolated type power supply includes monitoring a control signal which is used to switch the power switch in normal operation, and triggering a signal to stop the power switch from switching when the control signal is detected greater than a threshold.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
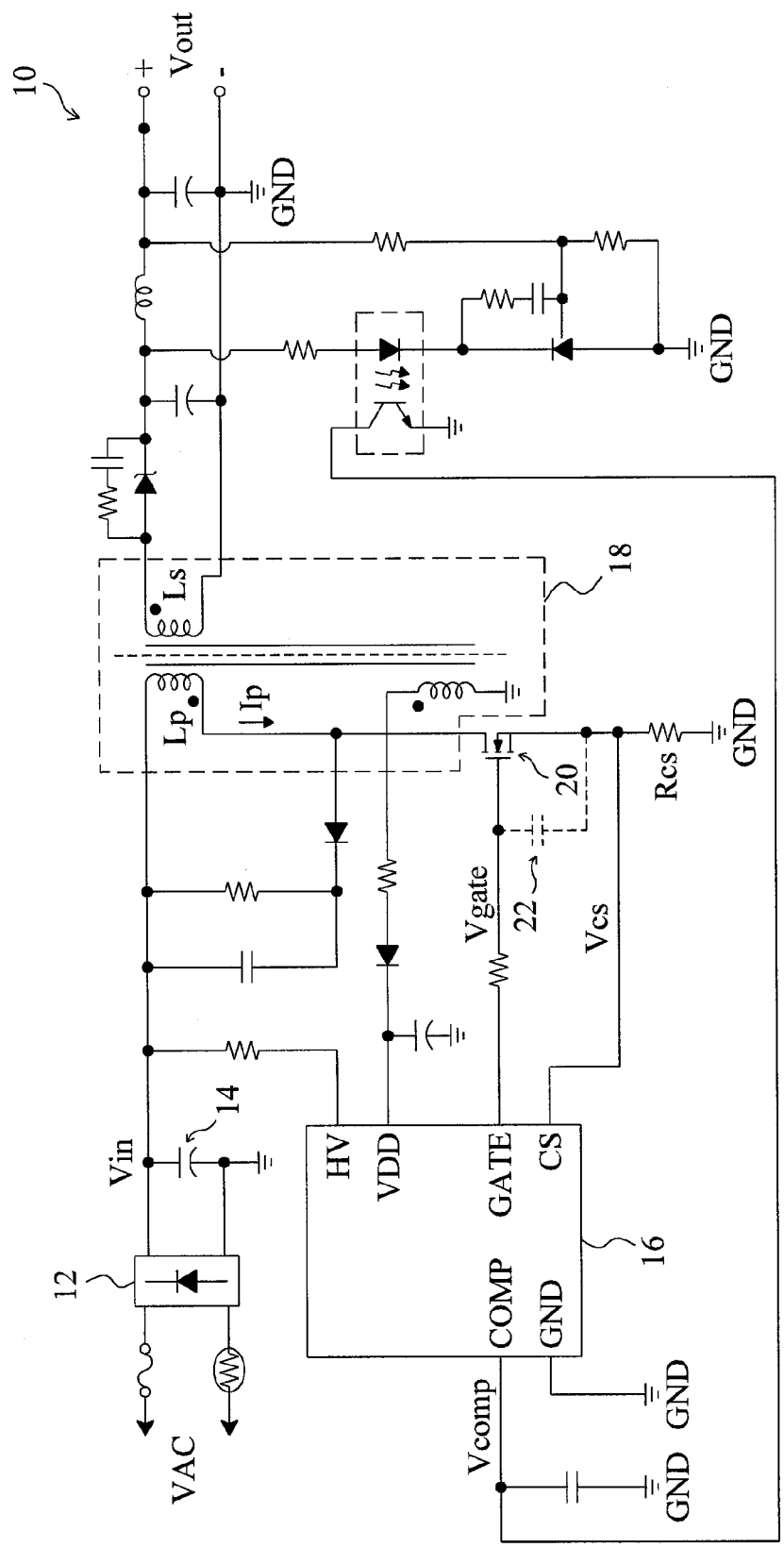
FIG. 1 is a circuit diagram of a typical isolated type power supply.
Figure 2:
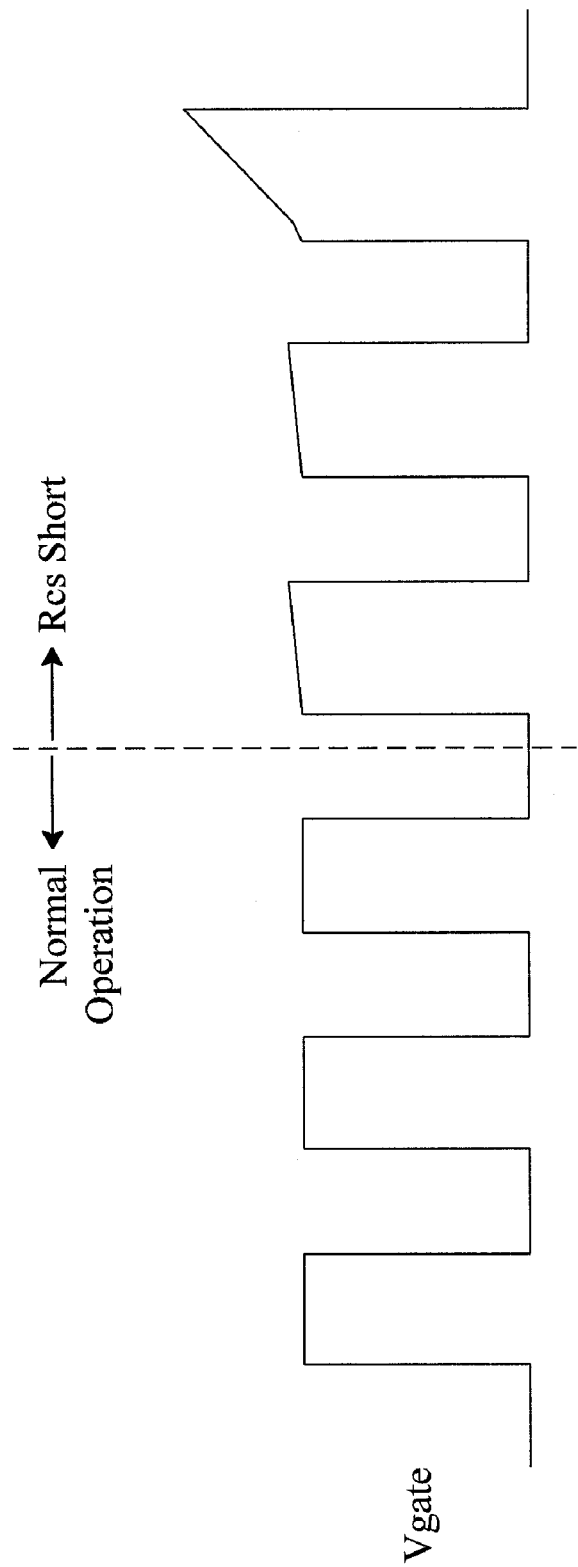
FIG. 2 is a waveform diagram of the control signal when the current sense resistor shown in FIG. 1 becomes short circuit.

Referring to FIG. 1, in a real hardware, the short circuit of the current sense resistor Rcs will not result in zero resistance between the source of the power switch 20 and the ground terminal GND and thus the voltage Vcs still increases with the increasing current Ip in this case. On the other hand, in a real hardware, the gate and the source of the power switch 20 always have a parasitic capacitor 22 therebetween, and this parasitic capacitor 22 will pull high the control signal Vgate following the increasing voltage Vcs. FIG. 2 is a waveform diagram of the control signal Vgate when the current sense resistor Rcs becomes short circuit. In normal operation, the control signal Vgate has substantially square waveforms. However, after the current sense resistor Rcs becomes short circuit, the ON-time of the control signal Vgate will have significantly increased level, and more and more steeper as time goes by. Thus, the level of the control signal Vgate can be used for detection for short circuit of the current sense resistor Rcs. For instance, when the level of the control signal Vgate increases to a preset threshold, it may conclude that the current sense resistor Rcs has become short circuit, and the power switch 20 is turned off to force the isolated type power supply 10 entering a protection mode.

Figure 3:
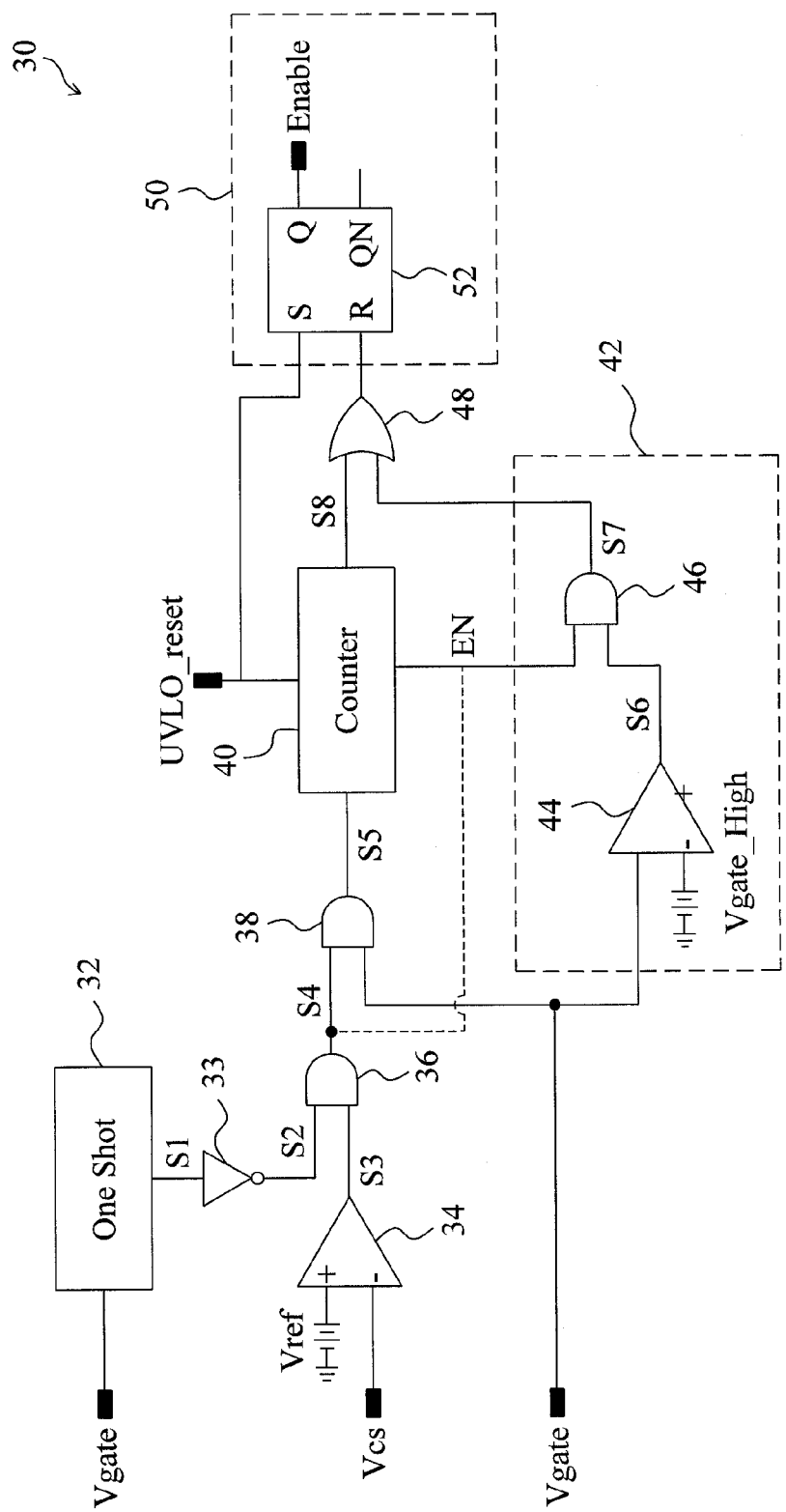
FIG. 3 is a circuit diagram of an embodiment according to the present invention.
Figure 4:
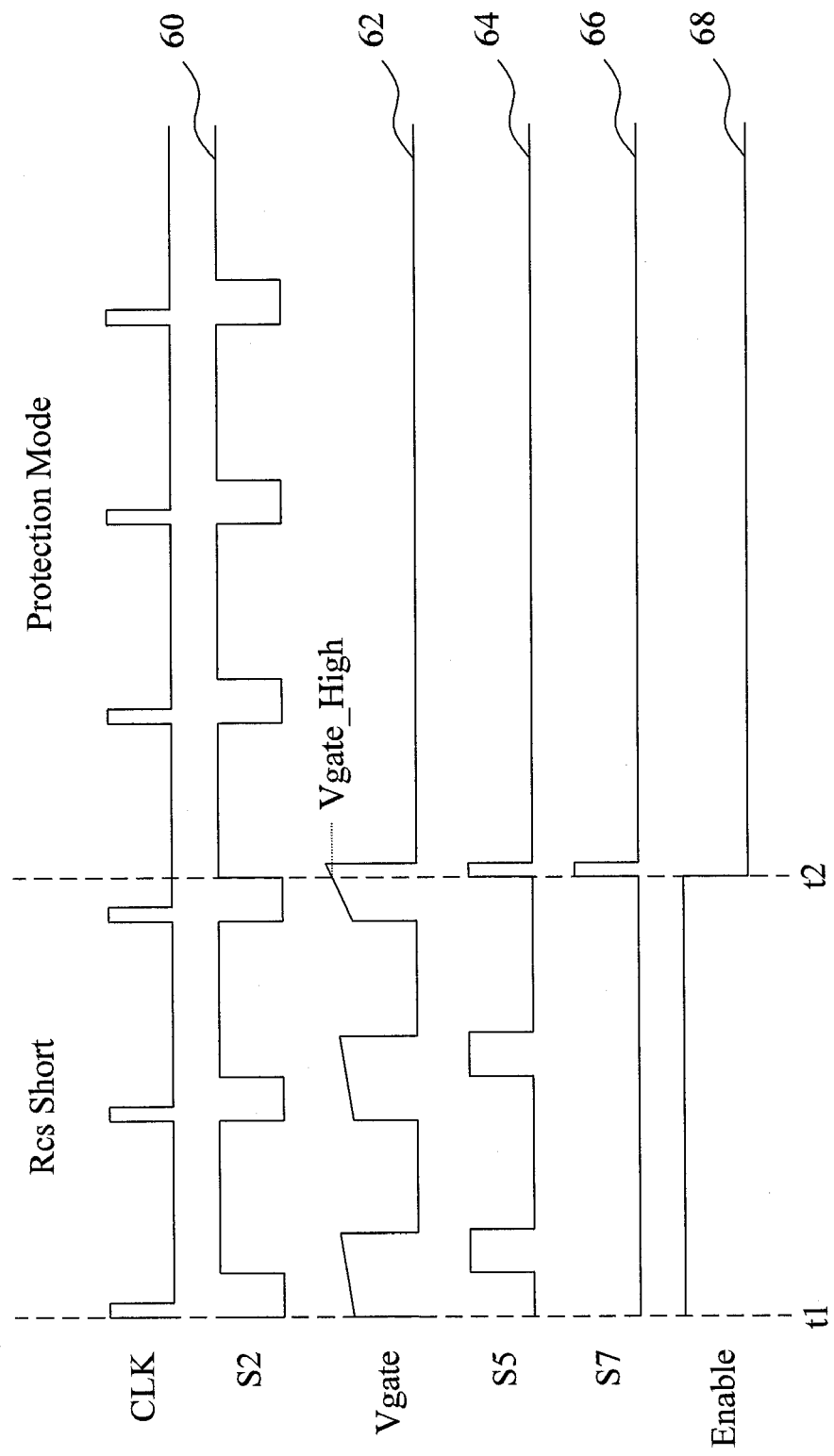
FIG. 4 is a waveform diagram of the circuit shown in FIG. 3.

FIG. 3 is a circuit diagram of an embodiment according to the present invention, and FIG. 4 is a waveform diagram of this circuit 30 shown in FIG. 3. Referring to FIGS. 1, 3 and 4, in the protection apparatus 30, a one shot circuit 32 triggers a one shot signal S1 responsive to the control signal Vgate, an inverter 33 generates a one shot signal S2 from the one shot signal S1, as shown by waveform 60, a comparator 34 compares the voltage Vcs of the current sense resistor Rcs with a reference voltage Vref to determine a signal S3 which is high when the voltage Vcs is lower than the reference voltage Vref, an AND gate 36 receives the signals S2 and S3 to identify whether the voltage Vcs is still lower than the reference voltage Vref after the power switch 20 is turned on for a period, and if yes, generates a high-level signal S4, an AND gate 38 receives the signal S4 and the control signal Vgate to identify whether the voltage Vcs is lower than the reference voltage Vref during the power switch 20 is on, and if yes, generates a high-level signal S5, as shown by waveform 64, and a counter 40 counts the number of the continuous appearances of the high-level signal S5 to trigger a signal S8. If the signal S5 continuously appears in plural successive cycles, for example eight successive cycles, the signal S8 is triggered to reset a flip-flop 52 in a suspension circuit 50 through an OR gate 48. Thereby, the flip-flop 52 resets its output signal Enable which is used to stop the power switch 20 from switching and consequently forces the isolated type power supply 10 entering a protection mode.

For quicker detection for short circuit of the current sense resistor Rcs, the protection apparatus 30 further includes a detection circuit 42 to monitor the control signal Vgate. In the duration where the current sense resistor Rcs is short circuit, for example, the period between time t1 and time t2, the level of the control signal Vgate raises with increase of the current Ip, as shown by waveform 62. At the time t2, the control signal Vgate becomes greater than a threshold Vgate_High and consequently, the detection circuit 42 triggers a protection signal S7, as shown by waveform 66. This protection signal S7 resets the flip-flop 52 through the OR gate 48 and thus resets the output signal Enable of the flip-flop 52, as shown by waveform 68, thereby stopping the power switch 20 from switching to force the isolated type power supply 10 entering a protection mode. For preventing the detection circuit 42 from mis-operation, an enable signal EN is provided to the detection circuit 42. After the power switch 20 is turned on for a period, if the voltage Vcs is lower than the reference voltage Vref, the detection circuit 42 is enabled. In this embodiment, the enable signal EN may be provided by the counter 40 or the AND gate 36. The counter 40 may trigger the enable signal EN whenever the AND gate 38 triggers a high-level signal S5, or when the AND gate 38 continuously triggers a high-level signal S5 for several times. In the detection circuit 42, the comparator 44 compares the control signal Vgate with the threshold Vgate_High to determine a comparison signal S6, and an AND gate 46 determines the protection signal S7 according to the enable signal EN and the comparison signal S6.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A protection apparatus for an isolated type power supply including a transformer whose primary coil is serially connected with a power switch to switch a current of the primary coil by a control signal and a current sense resistor to detect the current of the primary coil, the protection apparatus comprising:
   a detection circuit connected to the power switch, operative to monitor the control signal to trigger a protection signal when the control signal becomes greater than a threshold; and
   a suspension circuit connected to the detection circuit, operative to stop the power switch from switching responsive to the protection signal.

2. The protection apparatus of claim 1, wherein the detection circuit is enabled by an enable signal when the power switch is turned on for a period and a voltage of the current sense resistor is lower than a second threshold.

3. The protection apparatus of claim 2, wherein the detection circuit comprises:
   a comparator connected to the power switch, for comparing the control signal with the first threshold to determine a comparison signal; and
   a logic circuit connected to the comparator, operative to generate the protection signal according to the comparison signal and the enable signal.

4. The protection apparatus of claim 2, further comprising a comparator connected to the current sense resistor, for comparing the voltage of the current sense resistor with the second threshold to trigger the enable signal when the power switch is turned on for a period and the voltage of the current sense resistor is lower than the second threshold.

5. The protection apparatus of claim 2, further comprising a counter operative to trigger the enable signal when the power switch is turned on for a period and the voltage of the current sense resistor is lower than the second threshold.

6. The protection apparatus of claim 2, further comprising a counter operative to trigger the enable signal when it is detected in a plurality of successive cycles where the power switch is turned on for a period and the voltage of the current sense resistor is lower than the second threshold.

7. The protection apparatus of claim 1, wherein the suspension circuit comprises a flip-flop operative to provide an output signal responsive to the protection signal to stop the power switch from switching.

8. A protection method for an isolated type power supply including a transformer whose primary coil is serially connected with a power switch to switch a current of the primary coil by a control signal and a current sense resistor to detect the current of the primary coil, the protection method comprising the steps of:
   (A) monitoring the control signal; and
   (B) triggering a signal to stop the power switch from switching when the control signal is greater than a threshold.

9. The protection method of claim 8, wherein the step (B) comprises the step of enabling the signal to stop the power switch from switching to be triggered only when the power switch is turned on for a period and a voltage of the current sense resistor is lower than a second threshold.

* * * * *